United States Patent
Cho et al.

(10) Patent No.: US 9,951,831 B2
(45) Date of Patent: Apr. 24, 2018

(54) METHOD OF PREVENTING VEHICLE CLUTCH FROM STICKING

(71) Applicant: HYUNDAI MOTOR COMPANY, Seoul (KR)

(72) Inventors: Sung Hyun Cho, Yongin-si (KR); Ho Sung Kim, Anyang-si (KR); Ho Young Lee, Bucheon-si (KR); Jin Woo Lee, Gangwon-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 288 days.

(21) Appl. No.: 15/053,753

(22) Filed: Feb. 25, 2016

(65) Prior Publication Data
US 2017/0122388 A1    May 4, 2017

(30) Foreign Application Priority Data
Nov. 4, 2015    (KR) .................. 10-2015-0154450

(51) Int. Cl.
*F16D 48/08*    (2006.01)

(52) U.S. Cl.
CPC .... *F16D 48/08* (2013.01); *F16D 2500/10412* (2013.01); *F16D 2500/304* (2013.01); *F16D 2500/5023* (2013.01); *F16D 2500/50233* (2013.01); *F16D 2500/50245* (2013.01); *F16D 2500/50251* (2013.01)

(58) Field of Classification Search
None
See application file for complete search history.

(56) References Cited

U.S. PATENT DOCUMENTS

| 7,155,994 | B2 | 1/2007 | Gumpoltsberger |
| 8,220,348 | B2 | 7/2012 | Maurel |
| 8,998,773 | B2 | 4/2015 | Schneider et al. |
| 2009/0282934 | A1 | 11/2009 | Maurel |
| 2014/0150583 | A1 | 6/2014 | Terashima |

FOREIGN PATENT DOCUMENTS

| JP | 2012-007659 A | 1/2012 |
| JP | 2013-015183 A | 1/2013 |
| KR | 10-2009-0010085 A | 1/2009 |
| KR | 10-1293020 B1 | 8/2013 |
| KR | 10-2014-0145006 A | 12/2014 |

OTHER PUBLICATIONS

Office Action dated Mar. 20, 2017 in corresponding Korean Patent Application No. 10-2015-0154450.

*Primary Examiner* — Jacob S. Scott
(74) *Attorney, Agent, or Firm* — McDermott Will & Emery LLP

(57) ABSTRACT

A method of preventing a vehicle clutch from sticking includes a wear compensation actuation step of actuating a wear compensation device in conjunction with engagement actuation of a clutch actuator after an ignition is turned off when an actuation condition of the wear compensation device is satisfied, and a clutch control step of controlling a clutch position so that the clutch position returns to a disengaged state of the clutch actuator by reactuating the wear compensation device, when a clutch position based on an amount of variation in an actuation length of the actuation rod fails to return to the disengaged state of the clutch actuator during returning of the engaged clutch actuator.

6 Claims, 5 Drawing Sheets

METHOD OF PREVENTING VEHICLE CLUTCH FROM STICKING

CROSS REFERENCE TO RELATED APPLICATION

The present application claims the benefit of priority to Korean Patent Application No. 10-2015-0154450, filed Nov. 4, 2015 with the Korean Intellectual Property Office, the entire contents of which is incorporated herein for all purposes by this reference.

TECHNICAL FIELD

The present disclosure generally relates to a method of preventing a vehicle clutch from sticking. More particularly, the present disclosure relates to a method of preventing a vehicle clutch from sticking whereby actuating the clutch in a range in which clutch sticking may occur is avoided.

BACKGROUND

Generally, in an Automated Manual Transmission (AMT) and Dual Clutch Transmission (DCT) configured to control a clutch by a clutch actuator, when clutch wear is beyond a predetermined level, it is required to maintain a clutch stroke within a predetermined range by using a clutch wear compensation device, thereby ensuring an accurate clutch actuation.

The type of clutch wear compensation device built in a clutch actuator among the clutch wear compensation devices is designed so that wear compensation is performed by predetermined actuation during the actuation stroke of the clutch actuator.

For example, the wear compensation device is located above an upper end of a clutch position, and thus, the wear compensation device may be actuated when the clutch position is pushed by an approximately full stroke by actuating the clutch actuator.

That is, when the clutch position moves or returns beyond a predetermined location during the actuation stroke of the clutch, variation in a clutch touch point is generated.

Meanwhile, the wear compensation device is structurally problematic in that a baulking phenomenon may occur when gears are engaged with each other, and thus, clutch sticking, in which the clutch fails to normally return, may occur.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art, and the present disclosure is intended to propose a method of preventing a vehicle clutch from sticking, whereby actuating the clutch in a range in which clutch sticking may occur is avoided.

In order to achieve the above object, according to one aspect of the present disclosure, there is provided a method of preventing a vehicle clutch from sticking, the clutch being configured such that an actuation rod actuating a clutch fork is actuated in conjunction with a clutch actuator, and a wear compensation device is actuated in an actuation range beyond a predetermined stroke of the clutch actuator, the method including: a wear compensation condition determination step of determining whether an actuation condition of a clutch wear compensation device is satisfied; a wear compensation actuation step of actuating the wear compensation device in conjunction with engagement actuation of the clutch actuator after an ignition is turned off, when the actuation condition of the wear compensation device is satisfied; and a clutch control step of controlling a clutch position so that the clutch position returns to the disengaged state of the clutch actuator by reactuating the wear compensation device, when the clutch position based on the amount of variation in an actuation length of the actuation rod fails to return to the disengaged state of the clutch actuator during returning of the engaged clutch actuator.

The actuation condition of the clutch wear compensation device at the wear compensation condition determination step may be determined depending on whether a touch point is appropriate.

The clutch control step may include: an actuation completion determination step of determining whether an ignition is turned on before actuation completion of the wear compensation device; a clutch position determination step of determining whether the clutch position is located in an expected sticking section corresponding to the actuation range of the wear compensation device, when the ignition is turned on before the actuation completion of the wear compensation device; and a sticking release step of actuating the wear compensation device by the clutch actuator when the clutch position is located in the expected sticking section so that the clutch position departs from the expected sticking section, and returns to the disengaged state of the clutch actuator.

When it is determined at the clutch position determination step that the clutch position is located outside the expected sticking section corresponding to the actuation range of the wear compensation device, a return step of actuating the clutch actuator may be performed so that the clutch position returns to the disengaged state of the clutch actuator.

When it is determined at the actuation completion determination step that actuation of the wear compensation device is completed without turning on the ignition during the operation of the wear compensation device, a return determination step may be performed to determine whether the clutch position returns to a clutch release section corresponding to the disengaged state of the clutch actuator within a predetermined time, and when the clutch position fails to return to the clutch release section within the predetermined time, the sticking release step of actuating the wear compensation device by the clutch actuator may be performed so that the clutch position returns to the disengaged state of the clutch actuator.

The actuation rod may be rectilinearly moved by the clutch actuator; the amount of variation in the actuation length of the actuation rod may be measured by a wear compensation sensor; and actuation of the clutch actuator may be controlled by a controller.

According to the present disclosure, when the clutch position fails to normally return due to a structural problem of a wear compensation device, the clutch sticking problem, which may occur due to a clutch actuator or the wear compensation device, can be solved in such a way that the actuation rod is introduced to a range, in which the actuation rod can be actuated, by operating the wear compensation device. Further, the present disclosure can prevent a breakdown in a transmission caused by the clutch sticking, thereby decreasing replacement cost of the transmission.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
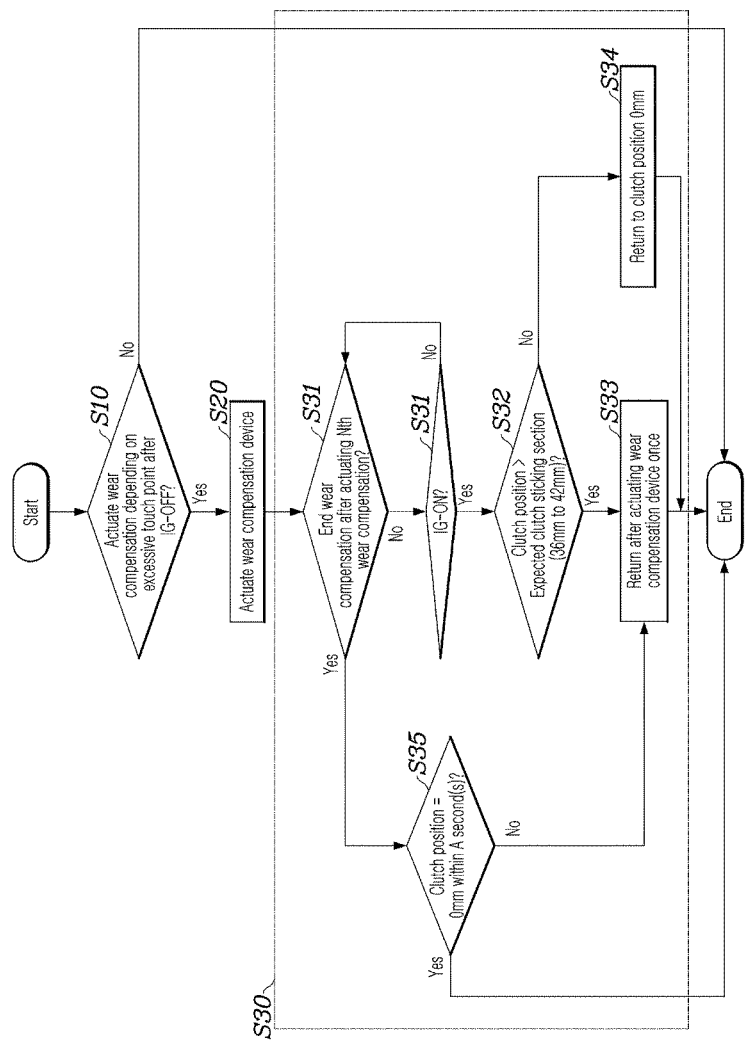
FIG. 1 is a view illustrating a control flow of a method of preventing a vehicle clutch from sticking according to the present disclosure.

Hereinbelow, exemplary embodiments of the present disclosure will be described in detail with reference to the accompanying drawings. Throughout the drawings, the same reference numerals will refer to the same or like parts.

Overall, a method of preventing a vehicle clutch from sticking according to the present disclosure may include a wear compensation condition determination step S10, a wear compensation actuation step S20 and a clutch control step S30.

Prior to describing the present disclosure in detail, structures of a clutch actuator 1 and a wear compensation device, which are applicable to the present disclosure, are described as follows. An actuation rod 17 actuating a clutch fork is actuated in conjunction with the clutch actuator 1, and the wear compensation device may be actuated in an actuation range beyond a predetermined stroke of the clutch actuator 1.

Figure 2A:
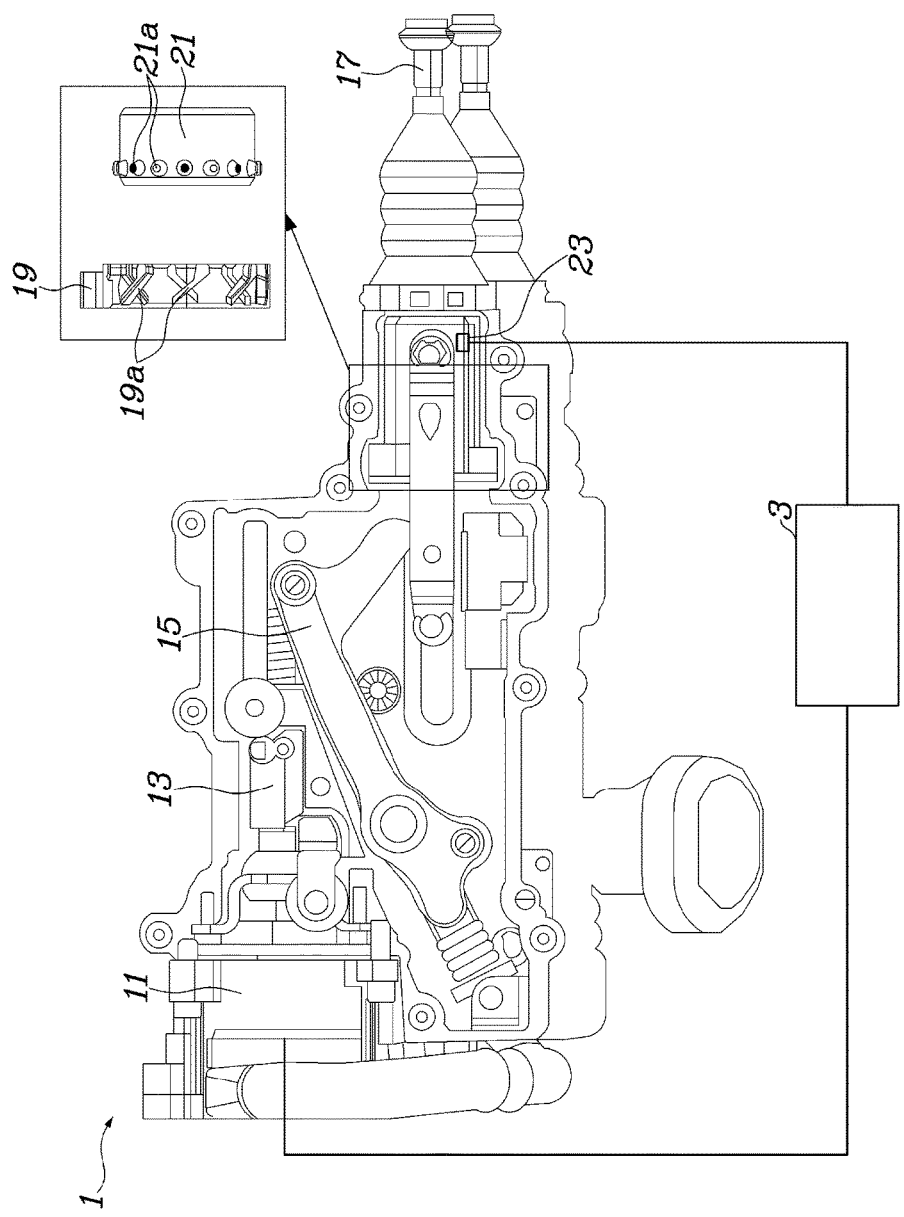
FIGS. 2A and 2B are views illustrating configurations of a clutch actuator and a wear compensation device, and views illustrating states of the clutch actuator being non-operational and the wear compensation device during the maximum stroke actuation according to the present disclosure.
Figure 2B:
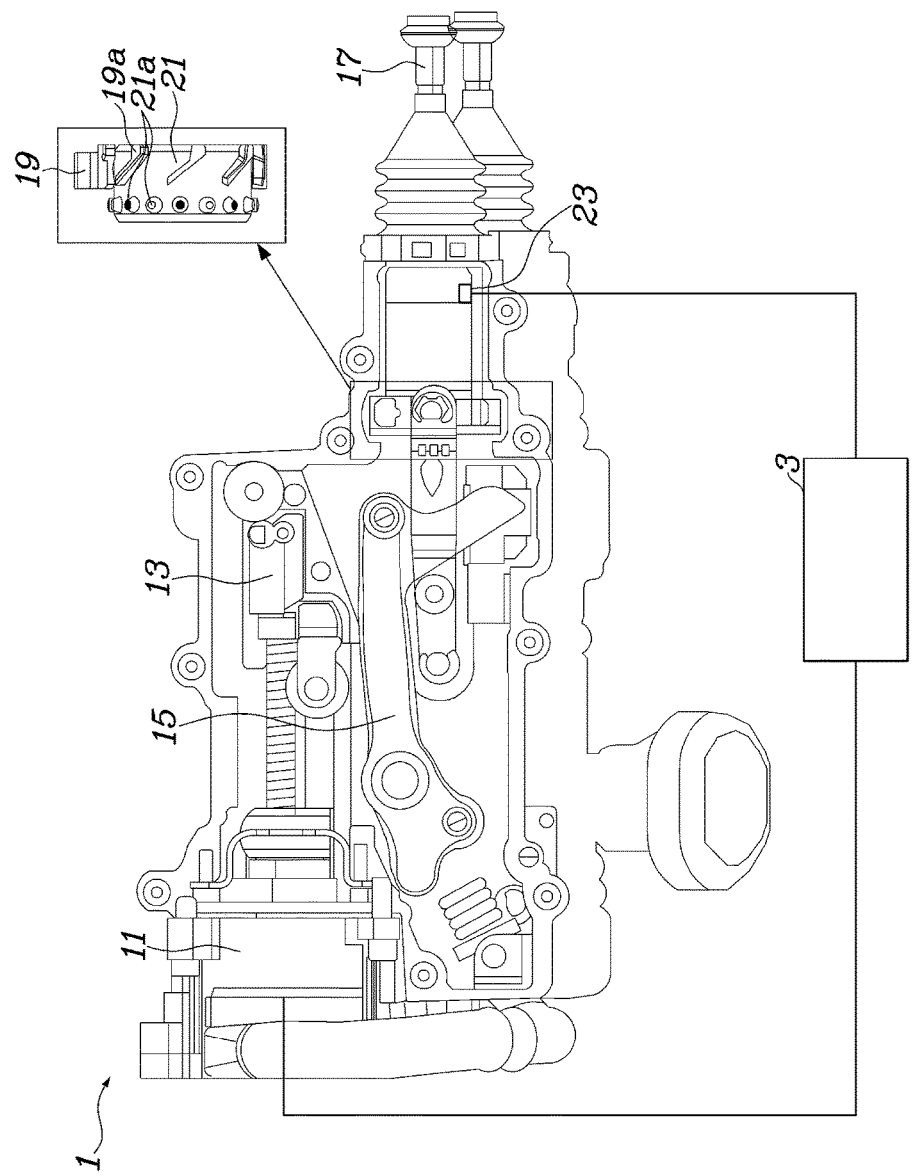
Figure 4:
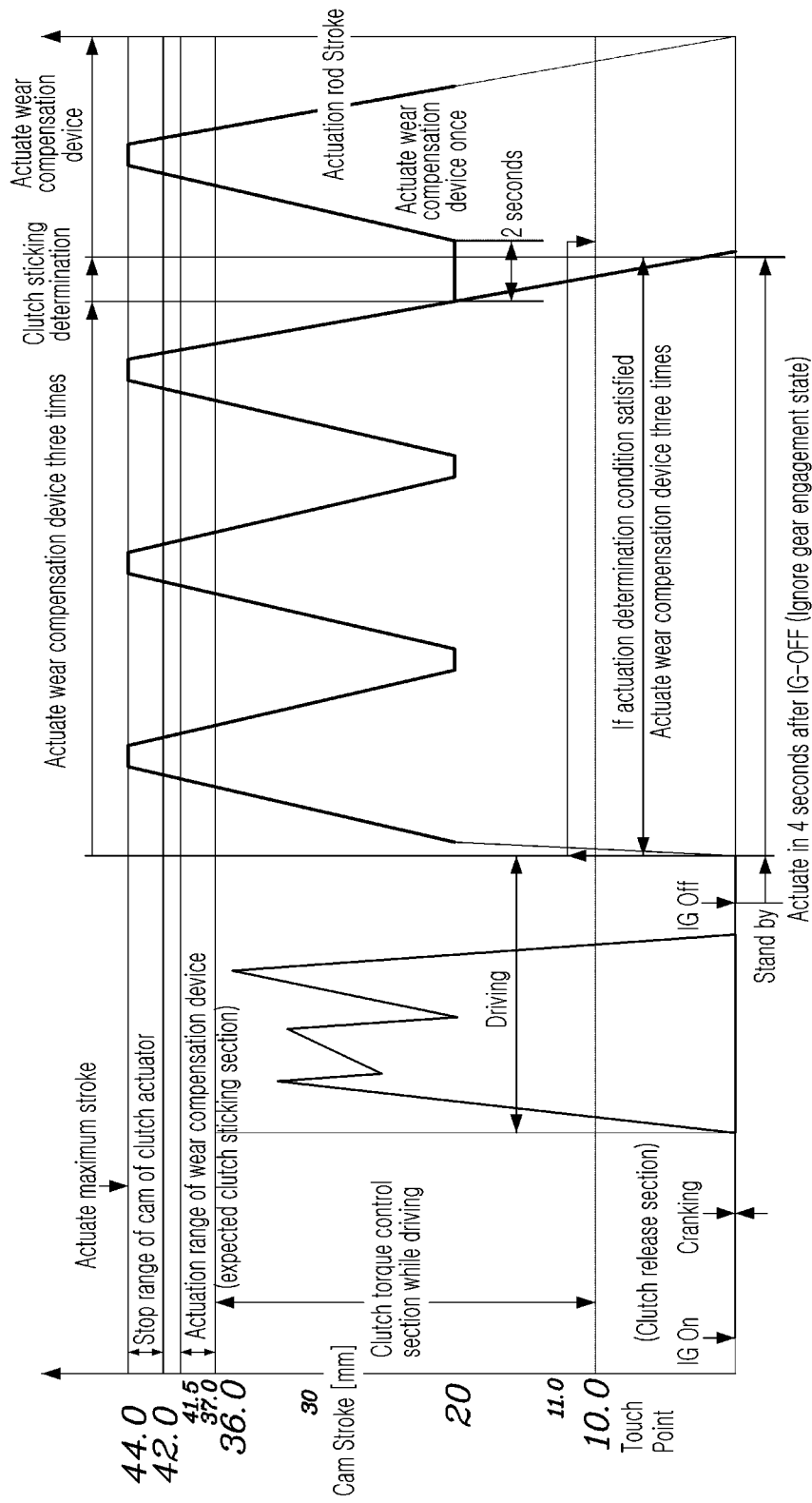
FIG. 4 is a view illustrating actuation of an actuation rod stroke depending on a clutch sticking after actuation of the wear compensation device is completed according to the present disclosure.

For example, referring to FIGS. 2A, 2B and 4, when an actuating motor 11 provided in the clutch actuator 1 is actuated, a cam 13 is rectilinearly moved in a predetermined cam stroke section by a rotation force of the actuating motor 11. Further, an actuation link 15 coming into contact with an inclined surface of the cam 13 is actuated and rotated in conjunction with the cam 13. Accordingly, the actuation rod 17 coming into contact with an end portion of the actuation link 15 is actuated in conjunction with the actuation link 15, and thus, the actuation rod 17 is rectilinearly moved in a predetermined actuation rod stroke section as well.

That is, as shown in FIG. 4, the cam 13 is moved between a 0 mm position and an about 36 mm position in the cam stroke section, the actuation rod 17 is moved in the actuation rod stroke section by being operated in conjunction with the cam. Thus, clutch torque may be controlled while driving.

In this case, the clutch actuator 1 may be controlled by a controller 3, and thus, the clutch may be engaged or disengaged.

Meanwhile, when actuation of the wear compensation device may be required depending on the extent of clutch wear, the wear compensation device may be actuated by moving the cam 13 to the maximum cam stroke position (about 42 mm).

Figure 3:
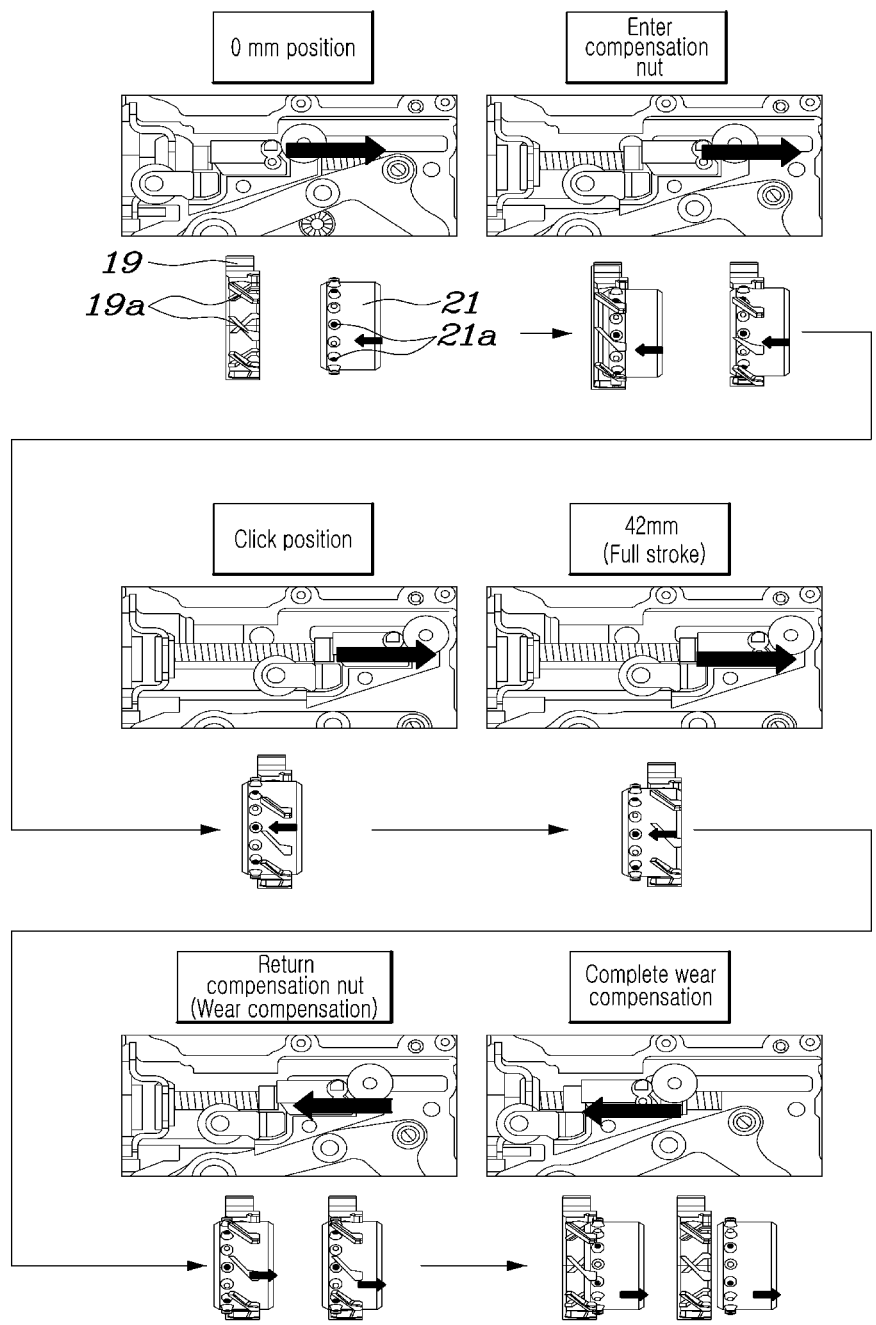
FIG. 3 is a view illustrating an actuating process of the wear compensation device according to an actuation range of the clutch actuator shown in FIGS. 2A and 2B according to the present disclosure.

For example, referring to FIGS. 3 and 4, when the cam 13 is rectilinearly moved by actuation of the actuating motor 11, both the actuation rod 17 and a wear compensation nut 21 are rectilinearly moved along with the cam 13.

In this case, since the wear compensation nut 21 is tightened in a threaded manner, the wear compensation nut 21 is rectilinearly moved when rotating, and thus, variation in a touch point is generated by the amount of movement caused by the rotation. Further, a wear compensation ring 19, concentric with the wear compensation nut 21, is provided on the axis which the wear compensation nut 21 is moved along, and the wear compensation ring 19 is rotated in a first rotation direction only in a state of binding a movement thereof in the axial direction. Further, when an external force for rotating the wear compensation ring 19 is removed, the wear compensation ring 19 may be rotated back to the previous state before rotating.

Compensation protrusions 21a may be formed along the outer circumferential surface of the wear compensation nut 21, and compensation guides 19a corresponding to the compensation protrusions 21a are formed in inclined directions on the inner circumferential surface of the wear compensation ring 19. Thus, the compensation protrusions 21a and the compensation guides 19a may be guided and operated in conjunction with each other.

That is, when the cam 13 is rectilinearly moved, the wear compensation nut 21 enters into the wear compensation ring 19. Thus, the wear compensation ring 19 is rotated in the first rotation direction in such a way that the compensation guides 19a are pushed by the compensation protrusions 21a being moved along inclined surfaces at first sides of the compensation guides 19a.

Furthermore, when the cam 13 is continuously moved, thereby entering into a stroke range corresponding to the actuation range of the wear compensation device, the wear compensation ring 19 is rotated back to the previous state in a second rotation direction in such a way that the compensation protrusions 21a pass over a position (a click position) in which the compensation protrusions 21a are separated from the compensation guides 19a.

Thereafter, after the cam 13 is moved to the maximum stroke position (44 mm), when the cam 13 returns to actuate wear compensation, the compensation nut is rotated by moving the compensation protrusions 21a along inclined surfaces at second sides of the compensation guides 19a. Further, variation in a touch point is generated by the rotation of the compensation nut, and thus, the wear compensation is performed.

Meanwhile, after specifically looking at the present disclosure with reference to FIG. 1 along with the structures of the clutch actuator 1 and the wear compensation device, it can be determined at the wear compensation condition determination step S10 whether the actuation condition of the clutch wear compensation device is satisfied.

For example, the actuation condition of the clutch wear compensation device may be determined depending on whether the touch point predetermined by a T-S curve is appropriate.

At the wear compensation actuation step S20, when the actuation condition of the wear compensation device is satisfied, the wear compensation device may be actuated in conjunction with the engage actuation of the clutch actuator 1 after an ignition is turned off. In this case, the wear compensation device may be actuated by the predetermined number of times.

At the clutch control step S30, when the clutch position based on the amount of variation in an actuation length of the actuation rod 17 fails to return to the disengaged state of the clutch actuator during returning of the engaged clutch actuator, the clutch position may be controlled so that the clutch position returns to the disengaged state of the clutch actuator 1 by reactuating the wear compensation device.

In this case, the actuation rod 17 connected to the clutch fork is rectilinearly actuated so that the clutch is engaged or disengaged. Thus, the clutch position may be ensured based on the amount of variation in a movement length of the actuation rod 17, and the amount of variation in the movement length of the actuation rod 17 may be measured using a wear compensation sensor 23 provided in an actuation range of the actuation rod 17. Furthermore, the amount of variation in the movement length of the actuation rod 17 measured using the wear compensation sensor 23 is input to the controller 3, thereby indentifying the clutch position.

That is, according to the structures described above, when the actuation rod 17 fails to return to the disengaged state of the clutch actuator 1 due to the structural problem of the wear compensation device, the structural problem of the wear compensation device may be solved by actuating the wear compensation device. Further, the actuation rod 17 may be introduced to a range in which the actuation rod 17 may be actuated, and thus, the clutch sticking problem, which may be caused by the wear compensation device, is solved, thereby ensuring the clutch actuation.

Meanwhile, as a preferred embodiment of the clutch control step S30, the clutch control step S30 may include: an actuation completion determination step S31 of determining whether an ignition is turned on before the actuation of the wear compensation device is completed; a clutch position determination step S32 of determining whether the clutch position is located in expected sticking section (the range between the 36 mm and 42 mm positions in the actuation rod stroke) corresponding to the actuation range of the wear compensation device when the ignition is turned on before the actuation of the wear compensation device is completed; and a sticking release step S33 of actuating the wear compensation device by the clutch actuator 1 so that the clutch position departs from the expected sticking section, thereby returning to the disengaged state when the clutch position is located in the expected sticking section.

That is, after the ignition is turned off, in a case of restarting a vehicle in a state of operating the wear compensation device, the actuation rod 17 may fail to return by being located in the section corresponding to the actuation range of the wear compensation device due to the structural problem of the wear compensation device.

For example, after the cam 13 is moved to the maximum stroke and the wear compensation nut 21 enters into the wear compensation ring 19 so as to actuate wear compensation, when the cam 13 returns, the wear compensation nut 21 should return by escaping from the wear compensation ring 19 as well. However, in a process of returning the wear compensation nut 21, a structural problem similar to the baulking phenomenon, in which the compensation protrusions 21a stick at the end portions of the compensation guides 19a, may occur.

In this case, when the wear compensation device is actuated once by the clutch actuator 1, the compensation protrusions 21a are temporarily separated from the compensation guides 19a, and then are advanced again. Thus, the baulking phenomenon is released, and the clutch position may return to the disengaged state of the clutch actuator 1.

Furthermore, the present disclosure may further include a return step S34 of actuating the clutch actuator 1 so that the clutch position returns to the disengaged state, when the clutch position is located outside the expected sticking section corresponding to the actuation range of the wear compensation device, as a result of determining the clutch position.

That is, when the compensation protrusions 21a return without becoming stuck with the compensation guides 19a, the cam 13 and the wear compensation nut 21 return together, and thus, the clutch actuator 1 may return to the disengaged (released) state of the clutch.

Meanwhile, in the present disclosure, when it is determined at the actuation completion determination step S31 that the actuation of the wear compensation device is completed without turning on the ignition during the operation of the wear compensation device, a return determination step S35 is performed to determine whether the clutch position returns to a clutch release section corresponding to the disengaged state of the clutch actuator within a predetermined time, and when the clutch position fails to return to the clutch release section within the predetermined time, the sticking release step S33 of actuating the wear compensation device by the clutch actuator 1 is performed so that the clutch position returns to the disengaged state of the clutch actuator.

That is, after the ignition is turned off, even when the wear compensation device completes a predetermined level, or number, of wear compensation actuation, the actuation rod 17 may fail to normally return to the disengaged state of the clutch due to the structural problem temporarily occurring in internal parts constituting the clutch actuator 1.

In this case, the wear compensation device is actuated once more by the clutch actuator 1, and the actuation rod 17 is introduced to the range in which the actuation rod 17 may be actuated. Thus, the clutch sticking problem, which may occur due to the internal parts of the clutch actuator 1, may be solved, thereby ensuring the clutch actuation.

A control flow of a method of preventing a vehicle clutch from sticking according to the present disclosure is described below.

Referring to FIG. 1, in a case of determining that the actuation of the wear compensation device is required while driving, the wear compensation is performed several times using the wear compensation device after the ignition is turned off. Accordingly, the wear compensation device is actuated, and thus, variation in the touch point is generated by the movement length of the actuation rod 17.

However, it is determined whether the clutch position is located in the expected sticking section (the range between the 36 mm position and the 42 mm position in the actuation rod stroke) corresponding to the actuation range of the wear compensation device, in a case of restarting a vehicle before the actuation of the wear compensation device is completed.

As a result of the determination, when the clutch position is located in the expected sticking section, the actuation rod 17 returns, and thus, the clutch is controlled to be located in the clutch position in which the actuation rod stroke is in the 0 mm position, after the wear compensation device is actuated once.

Meanwhile, when the clutch position is located outside the expected sticking section, the actuation rod stroke is controlled to be located in the position in which the actuation rod stroke is placed at the 0 mm position by returning the actuation rod 17.

Meanwhile, when the actuation of the wear compensation device is completed without restarting the vehicle while operating the wear compensation device, it is determined whether the clutch position is located at the 0 mm position.

As a result of the determination, when the clutch position fails to return to the 0 mm position within a predetermined time (for example, 2 seconds), the clutch position is controlled to be located at the 0 mm position by returning the actuation rod 17 after the wear compensation device is actuated once. In this case, the predetermined time is the maximum time required to return the cam stroke to the 0 mm position. For example, the predetermined time may be determined to be 2 seconds.

Referring to FIG. 4, even when the actuation rod 17 stays at the 20 mm position, fails to normally return, and thus, the clutch position is still engaged due to the structural problem temporarily occurring within the clutch actuator 1 actuating the actuation rod 17, the cam 13 connected to the actuating motor 11 may return to the disengaged state unlike the current clutch position.

Accordingly, when the actuation rod 17 fails to return within 2 seconds required to return the location of the cam, it may be determined that the actuation rod 17 fails to return because the clutch sticks temporarily occurs due to the internal structural problem of the clutch actuator 1. Thus, the clutch position returns to the 0 mm position in such a way that the wear compensation device is actuated once more.

As described above, in the present disclosure, when the clutch position fails to return to the 0 mm position, the clutch sticking problem, which may occur due to the clutch actuator 1 or the wear compensation device, may be solved in such a way that the actuation rod 17 is introduced to the range, in which the actuation rod 17 may be actuated, via operating the wear compensation device. Further, a breakdown in a transmission due to the clutch sticking is prevented, thereby decreasing replacement costs of the transmission.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method of preventing a vehicle clutch from sticking, the clutch being configured such that an actuation rod actuating a clutch fork is actuated in conjunction with a clutch actuator, and a wear compensation device is actuated in an actuation range beyond a predetermined stroke of the clutch actuator, the method comprising:
    a wear compensation actuation step of actuating the wear compensation device in conjunction with engagement actuation of the clutch actuator after an ignition is turned off when an actuation condition of the wear compensation device is satisfied; and
    a clutch control step of controlling a clutch position so that the clutch position returns to a disengaged state of the clutch actuator by reactuating the wear compensation device, when the clutch position based on an amount of variation in an actuation length of the actuation rod fails to return to the disengaged state of the clutch actuator during returning of the engaged clutch actuator.

2. The method of claim 1, further comprising:
    a wear compensation condition determination step of determining whether the actuation condition of the clutch wear compensation device is satisfied before the wear compensation actuation step, wherein
    the actuation condition of the clutch wear compensation device at the wear compensation condition determination step is determined depending on whether a touch point is appropriate.

3. The method of claim 1, wherein the clutch control step comprises:
    an actuation completion determination step of determining whether an ignition is turned on before actuation completion of the wear compensation device;
    a clutch position determination step of determining whether the clutch position is located in an expected sticking section corresponding to the actuation range of the wear compensation device when the ignition is turned on before the actuation completion of the wear compensation device; and
    a sticking release step of actuating the wear compensation device by the clutch actuator when the clutch position is located in the expected sticking section so that the clutch position departs from the expected sticking section and returns to the disengaged state of the clutch actuator.

4. The method of claim 3, wherein when it is determined at the clutch position determination step that the clutch position is located outside the expected sticking section corresponding to the actuation range of the wear compensation device, a return step of actuating the clutch actuator so that the clutch position returns to the disengaged state of the clutch actuator is performed.

5. The method of claim 3, wherein when it is determined at the actuation completion determination step that actuation of the wear compensation device is completed without turning on the ignition during the operation of the wear compensation device, a return determination step is performed to determine whether the clutch position returns to a clutch release section corresponding to the disengaged state of the clutch actuator within a predetermined time; and
    when the clutch position fails to return to the clutch release section within the predetermined time, the sticking release step of actuating the wear compensation device by the clutch actuator is performed so that the clutch position returns to the disengaged state of the clutch actuator.

6. The method of claim 1, wherein:
    the actuation rod is rectilinearly moved by the clutch actuator;
    the amount of variation in the actuation length of the actuation rod is measured by a wear compensation sensor; and
    actuation of the clutch actuator is controlled by a controller.

* * * * *